United States Patent Office 3,374,285
Patented Mar. 19, 1968

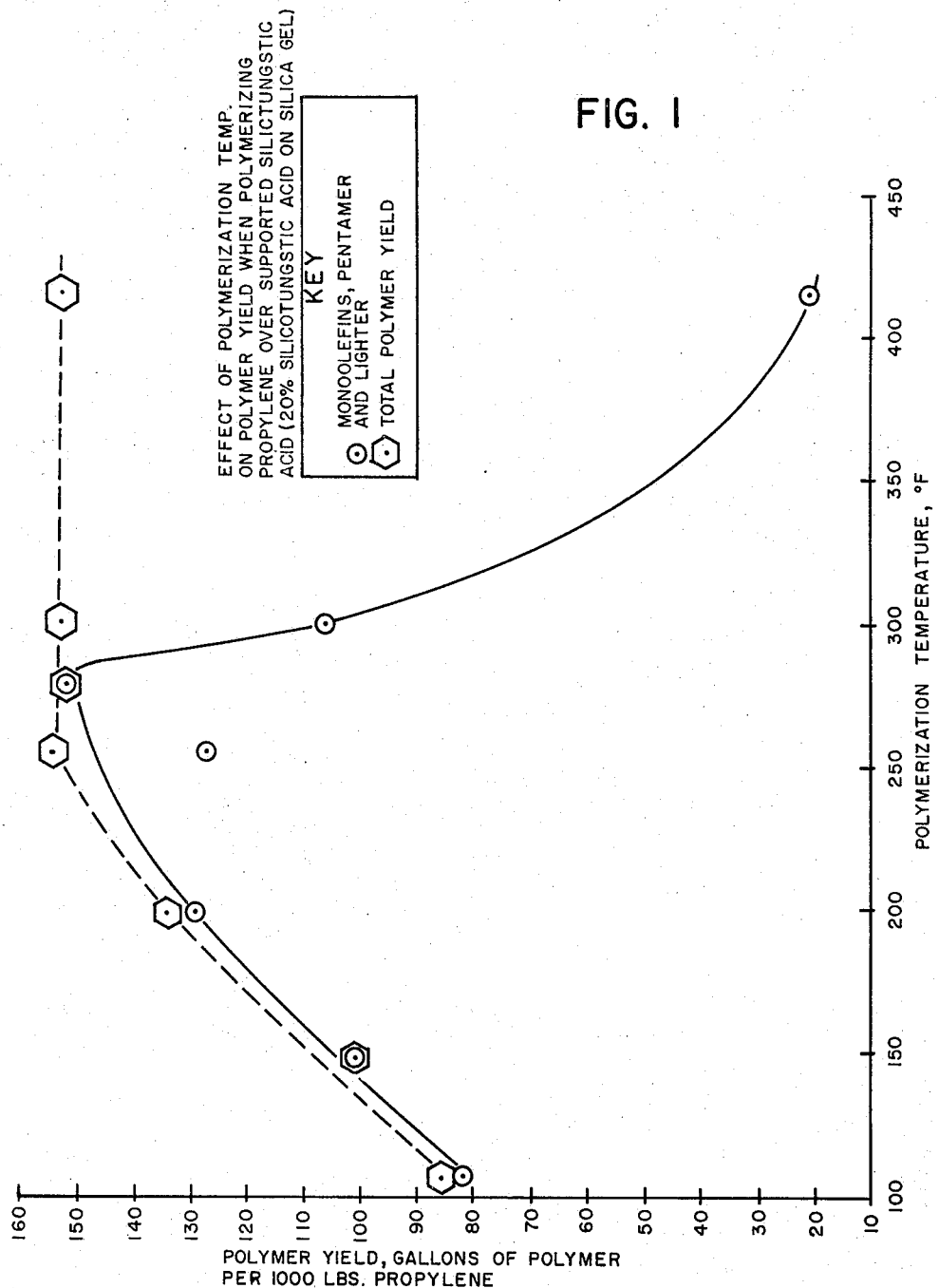

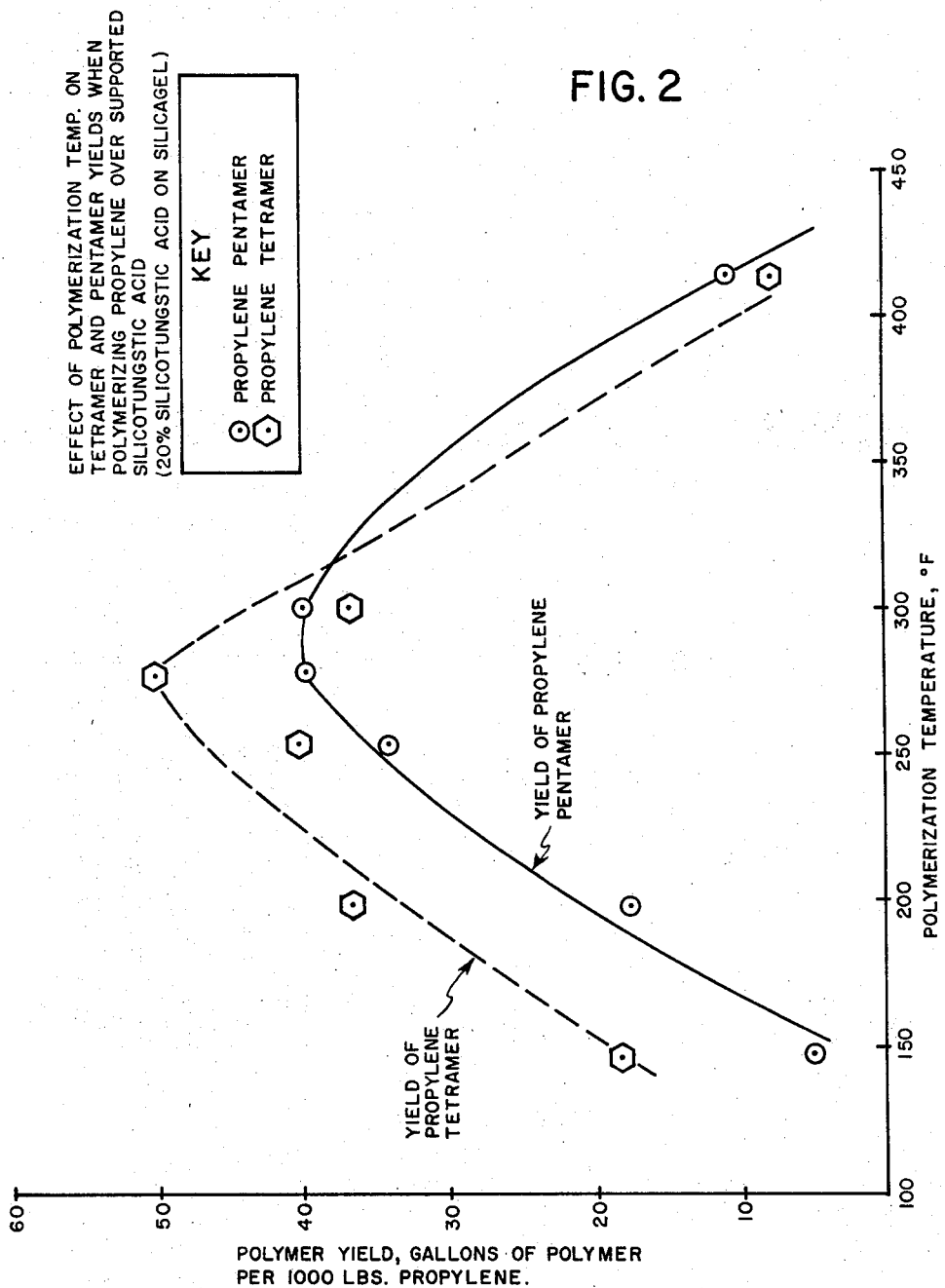

3,374,285
PROCESS FOR THE POLYMERIZATION
OF PROPYLENE
Alfred M. Henke, Springdale, and Raynor T. Sebulsky, Verona, Pa., assignors to Gulf Research & Development Company, Pittsburgh, Pa., a corporation of Delaware
Filed Dec. 29, 1964, Ser. No. 421,805
14 Claims. (Cl. 260—683.15)

This invention relates to an improved process for the production of olefins suitable for use in the preparation of detergents. In particular, this invention relates to the controlled polymerization of propylene to obtain maximum yields of substantially diolefin free propylene tetramer and pentamer.

The polymerization of propylene and other light olefins to produce low molecular weight polymers with various catalysts is known in the art. For example, the use of phosphoric acid on kieselguhr for the polymerization of propylene is a commercial process. The prior art processes have, however, certain disadvantages, such as the use of high reaction temperatures or an improper selectivity to propylene polymers having the desired number of carbon atoms per molecule. Formerly, propylene polymer was used directly as a gasoline component or as a charge stock to produce gasoline boiling range alkylate. It was desirable, therefore, to have the propylene polymerization process selective to the formation of propylene dimer and trimer. More recently the production of propylene tetramer and pentamer has become important as a charge stock for the production of detergents. The production of polymer above the pentamer range is, however, still undesirable since there is little market for the higher boiling polymer. In addition, for the production of detergent charge stocks it is necessary that the propylene tetramer and pentamer be substantially monoolefinic since the presence of diolefins is detrimental to the production of good detergents.

It is an object of the present invention to provide a process for the polymerization of propylene with a high selectivity to the production of useful polymeric products, that is, to the production of products having a maximum of 15 carbon atoms per molecule, and particularly with higher selectivity to propylene pentamer than is possible with the available commercial processes.

In accordance with the invention propylene is polymerized to a substantially diolefin free product suitable for use in the production of detergents by a process which comprises polymerizing propylene at a temperature less than 300° F. in the presence of a catalyst comprising a supported tungsten containing heteropoly acid.

In one preferred embodiment of this invention, maximum yields of propylene tetramer and pentamer substantially free of diolefins are obtained by a process which comprises polymerizing propylene at a temperature between 250° and 275° F. in the presence of a catalyst comprising a supported tungsten containing heteropoly acid.

The catalyst for use in the process of this invention is a tungsten containing heteropoly acid deposited on a solid carrier such as silica gel. The term "polyacid' 'is conventionally used to designate complex acids which contain several acidic radicals. Isopoly acids are generally regarded as polyacids containing one kind of acid radical. Heteropoly acids, on the other hand, result when two or more molecules of two or more acids combine with the elimination of water. Heteropoly acids are described in Volume 7 of the Kirk-Othmer Encyclopedia of Chemical Technology, pages 458 et seq. and the references therein. The heteropoly acids are soluble in oxygenated hydrocarbons, such as ethers, and are formed by the union of certain inorganic acid anhydrides, such as $WO_3$ and $MO_3$ with a second inorganic acid which is regarded as the parent acid as it supplies a central ion or atom of the final complex ion. Varying numbers of the acid anhydride molecules are combined with the parent acid in heteropoly acids, but usually 6 or 12 groups of $WO_3$, for example, unite with the parent acid to form the heteropoly acid. The heteropoly acids contain water of constitution and may contain water of hydration. In the process of this invention the heteropoly acid must be derived from tungstic acid, the use of heteropoly acids derived from molybdic acid having been found unsuitable in the temperature range of interest.

Examples of suitable tungsten containing heteropoly acids which can be used in the catalysts of the process of this invention include: 12-tungstophosphoric acid (phosphotungstic acid); 12-tungstosilicic acid (silicotungstic acid); 12-tungstoboric acid (borotungstic acid); 9-tungstrophosphoric acid; 10-tungstosilicic acid; 9-tungstoarsenic acid; silicotungstomolybdic acid; silicotungstovanadic acid; phosphotungstomolybdic acid; phosphotungstovanadic acid; borotungstomolybdic acid; arsenotungstic acid; periodotungstic acid; vanadotungstic acid; chromotungstic acid; ferrotungstic acid; and aluminotungstic acid.

Any solid support materials well known in the art can be used as a support for the tungsten containing heteropoly acid. The preferred support is silica gel or a silica containing support, such as a silica-alumina. Other suitable carriers include natural and synthetic aluminas, magnesia, clays, pumice and other metal oxides or mixtures of metal oxides.

Since it is known that strong alkalies progressively degrade the heteropoly acids, the catalyst support should be substantially free of alkali.

The heteropoly acid can be deposited on the support by any means well known in the art. For example, one suitable procedure is to impregnate the support material using a water solution of the acid followed by drying the catalyst at temperatures of say 250° F. The catalyst is then calcined prior to use by heating to a temperature between about 400° F. and 700° F.

The amount of the heteropoly acid can suitably be between 5 and 30 weight percent of the catalyst, and is preferably between 8 and 25 weight percent. If silica gel and alumina are used as the catalyst support, the most preferred heteropoly acid concentration is about 15 to 25 weight percent; while if a silica-alumina gel is used as the support, the most preferred concentration is about 8 to 15 weight percent.

The charge stock for the process of this invention comprises propylene. Diluent materials can be present in admixture with the propylene so long as they are unreactive. Suitable diluents include aliphatic and alicyclic hydrocarbons, such as propane and cyclopropane. A refinery propane-propylene stream is, for example, a suitable charge stock for the process of this invention. These refinery streams usually contain between about 30 and 70 weight percent propylene and between about 70 and 30 weight percent propane. The propane in this instance also serves as a heat sink during the reaction since the polymerization reaction is exothermic in nature.

The polymerization reaction proceeds by contacting the propylene in any suitable manner with the supported heteropoly acid at temperatures to be defined below. The charge stock comprising propylene is preferably passed through a column of catalyst granules with suitable means for controlling the temperature of the exothermic reaction. Dilution of the charge stock with propane as noted above is helpful but additional means are usually required. Dilution of the catalyst with an inert material, such as quartz granules, was found to be desirable. A very satisfactory method found was to have alternating zones of about equal size of quartz and a catalyst-quartz mixture wherein about 50 percent of the mixture was catalyst. Alternatively, temperature can be controlled by quenching between the reactor beds with fresh feed or with recycle propane.

The reaction temperature was found to be critical for the production of maximum yields of propylene polymers especially suitable for use in the manufacture of detergent alkylate, that is, for the production of maximum yields of propylene tetramer and pentamer. It has been found that in order to obtain maximum yields of substantially diolefin free product having a maximum of 15 carbon atoms per molecule, the reaction temperature must be maintained at less than 300° F. At temperatures above 300° F., the yield of substantially diolefin free monoolefins having a maximum of 15 carbon atoms decreases extremely rapidly. The reaction temperature can be as low as about 100° F. The preferred reaction temperatures are between 200° F. and 300° F. and more preferably are between 250° and 285° F. Advantageously it has been found that not only is a substantially diolefin free product having a maximum of 15 carbon atoms produced with the defined catalyst in the defined narrow reaction temperature range, but the highest yield of propylene tetramer and pentamer suitable for use in the preparation of detergent alkylate is also obtained.

By substantially diolefin free is meant less than about ten volume percent diolefins.

A suitable pressure range for operation of this process is 150 p.s.i.g. to 1500 p.s.i.g. Lower pressures can be employed, but in the temperature range applicable to this process, pressures below 150 p.s.i.g. would not maintain sufficient liquid phase in the reactor to exert a washing effect on the catalyst. In this operation the catalyst surfaces can become coated with high boiling polymer which will carbonize and reduce activity if there is insufficient liquid polymer to keep the catalyst clean. A preferred pressure range is 500 to 750 p.s.i.g. This provides adequate liquid phase to exert a washing effect. Higher pressures are not generally required, but may be advantageous for polymerizing very dilute propylene streams, for example, hydrocarbon streams containing 5 percent by weight or less propylene. Alternatively, a separate liquid wash oil stream such as a saturated cyclic or acyclic hydrocarbon can be employed to wash the catalyst surfaces. A suitable wash oil would include saturated hydrocarbons having between 4 and 20 carbon atoms per molecule such as straight run gasoline or furnace oil fractions, hydrogenated hydrocarbon streams such as hydrogenated cracked furnace oils, etc.

The space velocity can suitably be between 0.25 to about 5 or more and is preferably between 0.5 and 2.0 volumes of propylene per volume of catalyst per hour.

FIGURE 1 attached is a plot of the yield of propylene polymer in gallons of polymer per 1,000 pounds of propylene vs. the polymerization reaction temperature in degrees Fahrenheit. Referring to FIGURE 1, the total polymer yield increases as the reaction temperature increases and reaches a maximum plateau at a reaction temperature of about 250° F. The yield of monoolefins having a maximum of 15 carbon atoms per molecule parallels the total yield curve at the low reaction temperature up to about 275° F. and then breaks sharply so that at temperatures greater than 300° F., the yield of the desired monoolefin having a maximum of 15 carbon atoms decreases extremely rapidly. The polymerization reaction was run with a 65 weight percent propylene–35 weight percent propane stream at 600 p.s.i.g. and a liquid hourly space velocity of 1.0 based on the propylene.

FIGURE 2 attached is a plot of the yield of propylene tetramer and a proplene pentamer in gallons of polymer per 1,000 pounds of propylene versus polymer temperature in degrees Fahrenheit. Referring to FIGURE 2 it can be seen that the yield of tetramer maximizes at temperatures less than 300° F., and, in particular, at temperatures between 250° and 285° F. The yield of pentamer maximizes at slightly higher temperatures, but still less than about 300° F. The other reaction parameters were the same as for FIGURE 1.

The invention will be further described with reference to the following experimental work.

The charge stock was used in all of the experimental work was a refinery propane-propylene stream containing 65 weight percent propylene and 35 weight percent propane. The catalyst used varied in composition but in all cases was employed as 10 to 20 mesh granules. As noted above, because polymerization is highly exothermic, it was useful to dilute the catalyst with quartz chips to obtain better temperature control. Alternating zones of about equal size of quartz and a catalyst-quartz mixture containing about 50 percent catalyst were employed, thus splitting the reactor into a series of beds. Space velocities to be given below were calculated only on the quantity of active catalyst employed. The experimental runs were of seven hours' duration and generally included an off-stream period of three hours and two onstream periods of two hours each. Propylene conversions were determined by the change in propylene concentration between the feed and the exit gas. The reaction pressure in all runs was 600 p.s.i.g., while the liquid hourly space velocity was 1.0 based on the propylene. All of the catalysts used in the experimental work below were prepared by impregnation of the support used with a water solution of the acid with subsequent drying at 250° F. The catalysts prior to use were calcined at a temperature of 600° F. Three different catalyst supports were employed, i.e., (1) a Davison Grade 70 silica gel obtained from Davison Chemical Co.; (2) an eta alumina obtained from Davison Chemical Co.; and (3) an American Cyanamid Aerocat Triple A silica-alumina Grade 60/70 obtained from American Cyanamid Company. The characterists of each of these supports are given in Table I below.

TABLE I

| | Support | | |
|---|---|---|---|
| | Davison Grade 70 Silica Gel | Davison Eta Alumina | American Cyanamid Triple A |
| Surface Area (BET) m.²/gm | 313 | 225 | 453 |
| Pore Volume ml./gm | 1.20 | 0.38 | 0.77 |
| Average Pore Radius, angstroms | 85 | 32.4 | 36.8 |
| Na Content, weight percent | 0.027 | 0.003 | 0.010 | pylene was zero percent. Increasing the reaction temperatures to 400° F. resulted in a propylene conversion of only 5.9 percent. The results of this run are also shown on Table II below. Referring to Table II, a comparison of Examples I, II and III shows that it is essential for the process of this invention, using the relatively low reaction temperatures, that the heteropoly acid be derived from tungstic acid, that is, that the heteropoly acid be a tungsten containing heteropoly acid, for zero percent conversion (Ex. III) was obtained with the phosphomolybdic heteropoly acid catalyst.

TABLE II.— COMPARISON OF EFFECTIVENESS OF VARIOUS SUPPORTED HETEROPOLY ACIDS FOR POLYMERIZATION OF PROPYLENE

Feed: 65:35 Mole Ratio Propylene-Propane Stream
Conditions: 600 p.s.i.g., 1 LHSV (Based on Propylene in Feed)

| Example No | I | | II | | III |
|---|---|---|---|---|---|
| Catalyst | 20% Phosphotungstic Acid/Silica Gel [1] | | 20% Silicotungstic Acid/Silica Gel [1] | | 20% Phosphomolybdic Acid/Silica Gel [1] |
| Reaction Temperature, ° F | 254 | | 253 | | 251 |
| Propylene Conversion, percent | 99.6 | | 99.7 | | 0 |
| Polymer Gravity, ° API | 50.4 | | 50.9 | | |
| Total Polymer Yield, gals./1000 lbs. of Propylene Fed | 153.8 | | 154.4 | | 0 |
| | Percent by Vol. | Gals./1,000 lbs. of Propylene Fed | Percent by Vol. | Gals./1,000 lbs. of Propylene Fed | |
| Product Distribution: | | | | | |
| Monoolefins: | | | | | |
| Dimer | 8 | 12.3 | 6 | 9.3 | |
| Trimer | 25 | 38.5 | 28 | 43.2 | |
| Tetramer | 32 | 49.3 | 26 | 40.1 | |
| Pentamer | 24 | 36.9 | 22 | 34.0 | |
| Heavier than Pentamer | 8 | 12.3 | 11 | 17.0 | |
| Diolefins: | | | | | |
| Pentamer Range and Lighter | 3 | 4.5 | 5 | 7.7 | |
| Heavier than Pentamer | 0 | 0 | 2 | 3.1 | |
| Yield of Monoolefins having a maximum of 15 carbon atoms per Molecule | 89 | 137.0 | 82 | 126.6 | |
| Total Yield of Diolefins, Aromatics, and Monoolefins Heavier than Pentamer Y | 11 | 16.8 | 18 | 27.8 | |

[1] Davison Grade 70 Silica Gel.

*Example I*

In this example, the catalyst consisted of 20 weight percent phosphotungstic acid on a silical gel support which was prepared by impregnating silica gel with an aqueous solution of phosphotungstic acid and thereafter drying the impregnated silica gel at 250° F. The reaction temperature was 254° F. The results are shown in Table II below.

*Example II*

Example I was repeated except silicotungstic acid was used in place of the phosphotungstic acid. The results of this run are also shown in Table II below.

*Example III*

Example I was repeated except the catalyst was a phosphomolybdic heteropoly acid and the reaction temperature was slightly lower at 251° F. The conversion of pro- Referring to Table II above, a further comparison of Examples I and II shows that the phosphotungstic acid is preferred since the yield of monoolefins having a maximum of 15 carbon atoms per molecule was higher (89 versus 82 percent) and slightly less diolefin was made (3 versus 5 percent). The yield of tetramer and pentamer for the phosphotungstic acid was also higher being 56 volume percent compared to 48 volume percent for the silicotungstic heteropoly acid.

A series of runs was made to show the effect of reaction temperature on polymer distribution and yield when polymerizing propylene over a silica gel supported silicotungstic acid catalyst. The results are shown in Examples IV through X in Table III below. The results are also shown in FIGURES 1 and 2 which were discussed earlier. Example VII in Table III below is the same as Example II in Table II above and is inserted again for ease in reading the data. The total yield of polymer increases with reaction temperature up to about 250° F. as does the yield of monoolefins having a maximum of 15 carbon atoms per molecule up to about 275° F. Reference is made to the discussion of FIGURES 1 and 2 above for a further elaboration on the significance of these data.

TABLE III.—EFFECT OF POLYMERIZATION TEMPERATURE ON POLYMER DISTRIBUTION AND YIELD WHEN POLYMERIZING PROPYLENE OVER SUPPORTED SILICOTUNGSTIC ACID CATALYST

Catalyst: 20% Silicotungstic Acid on Silica Gel
Feed: 65.35 Mole Ratio Propylene-Propane Stream
Conditions: 600 p.s.i.g, 1 LHSV (Based on Propylene in Feed)

| Example No. | IV | | V | | VI | | VII | | VIII | | IX | | X | |
|---|---|---|---|---|---|---|---|---|---|---|---|---|---|---|
| Reaction Temperature, °F | 107 | | 147 | | 199 | | 253 | | 278 | | 299 | | 412 | |
| Propylene Conversion, percent | 55.1 | | 63.4 | | 85.8 | | 99.7 | | 98.1 | | 100.0 | | 100.0 | |
| Polymer Gravity, °API | 52.3 | | 55.2 | | 53.0 | | 50.9 | | 50.9 | | 48.4 | | 48.2 | |
| Total Polymer Yield, gals./1000 lbs. of Propylene Fed | 86.0 | | 100.5 | | 134.4 | | 154.4 | | 151.9 | | 152.7 | | 152.5 | |
| | Percent by Vol. | Gals./1,000 lbs. of Propylene Fed | Percent by Vol. | Gals./1,000 lbs. of Propylene Fed | Percent by Vol. | Gals./1,000 lbs. of Propylene Fed | Percent by Vol. | Gals./1,000 lbs. of Propylene Fed | Percent by Vol. | Gals./1,000 lbs. of Propylene Fed | Percent by Vol. | Gals./1,000 lbs. of Propylene Fed | Percent by Vol. | Gals./1,000 lbs. of Propylene Fed |
| Product Distribution: | | | | | | | | | | | | | | |
| Monoolefins: | | | | | | | | | | | | | | |
| Dimer | 7 | 6.0 | 10 | 10.1 | 9 | 12.1 | 6 | 9.3 | 9 | 13.7 | 6 | 9.2 | 0 | 0 |
| Trimer | 45 | 38.7 | 67 | 67.3 | 47 | 63.1 | 28 | 43.2 | 32 | 48.6 | 13 | 19.9 | 2 | 3.1 |
| Tetramer | 35 | 30.1 | 18 | 18.1 | 27 | 36.3 | 26 | 40.1 | 33 | 50.1 | 24 | 36.6 | 5 | 7.6 |
| Pentamer | 8 | 6.9 | 5 | 5.0 | 13 | 17.5 | 22 | 34.0 | 26 | 39.5 | 26 | 39.7 | 7 | 10.7 |
| Heavier than Pentamer | 5 | 4.3 | 0 | 0 | 4 | 5.4 | 11 | 17.0 | 0 | 0 | 19 | 29.0 | 25 | 38.1 |
| Diolefins: | | | | | | | | | | | | | | |
| Pentamer Range and Lighter | 0 | 0 | 0 | 0 | 0 | 0 | 5 | 7.7 | 0 | 0 | 8 | 12.2 | 5 | 7.6 |
| Heavier than Pentamer | 0 | 0 | 0 | 0 | 0 | 0 | 2 | 3.1 | 0 | 0 | 4 | 6.1 | 16 | 24.4 |
| Aromatics: | | | | | | | | | | | | | | |
| Pentamer Range and Lighter | 0 | 0 | 0 | 0 | 0 | 0 | 0 | 0 | 0 | 0 | 0 | 0 | 17 | 25.9 |
| Heavier than Pentamer | 0 | 0 | 0 | 0 | 0 | 0 | 0 | 0 | 0 | 0 | 0 | 0 | 23 | 35.1 |
| Yield of Monoolefins having a maximum of 15 carbon atoms per molecule | 95 | 81.7 | 100 | 100.5 | 96 | 129.0 | 82 | 126.6 | 100 | 151.9 | 69 | 105.4 | 14 | 21.4 |
| Total Yield of Diolefins, Aromatics and Monoolefins Heavier than Pentamer | 5 | 4.3 | 0 | 0 | 4 | 5.4 | 18 | 27.8 | 0 | 0 | 31 | 47.3 | 86 | 131.1 |

A series of runs was made to test the effect of the amount of heteropoly acid on three different supports. In particular, catalysts were tested containing 20 percent, 10 percent and 5 percent of silicotungstic acid on Davison Grade 70 silica gel, whose characteristics are given on Table I above, and catalysts containing 20 percent and 10 percent silicotungstic acid on a Houdry Process Corporation S-46 silica-alumina cracking catalyst and a Filtrol Corporation Grade 86 alumina. The characteristics of the S-46 and Grade 86 base supports are given on Table IV below.

TABLE IV

| | Support | |
|---|---|---|
| | Houdry Process Corp. S-46 [1] | Filtrol Corp. Grade 86 |
| Surface Area, (BET) m.²/gm | 308 | 281 |
| Pore Volume, ml./gm | 0.42 | 0.46 |
| Average Pore Radius, angstroms | 31.8 | 37.4 |
| Na Content, weight percent | 0.09 | 0.014 |

[1] S-46 is a silica-alumina containing 12.5 weight percent alumina and 87.5 weight percent silica.

The results of the runs are given on Table V below.

mers with decreasing acid content. The 20 percent catalyst (Example XI) gave 61 percent by volume $C_{12}$ plus polymer including 15 percent $C_{15}$ while the 10 and 5 percent catalyst gave respectively 43 percent $C_{12}$ plus with 11 percent $C_{15}$; and 28 percent $C_{12}$ plus with 6 percent $C_{15}$ (see Examples XII and XIII).

The alumina supported catalysts (see Examples XVI and XVII) showed the same general effect with silicotungstic acid content as the catalyst supported on silica gel (Examples XI, XII and XIII). The decrease in conversion between the 20 and 10 percent acid content catalyst was more marked, however, going from 96.8 percent in Example XVI to 62 percent in Example XVII.

The results obtained with the silica-alumina supported catalyst were somewhat unexpected. There was a slight decrease in conversion between the 20 and 10 percent catalyst from 95.2 percent (Example XIV) to 94.3 percent (Example XV); however, in contrast to the other two supports, the shift in molecular weight was towards higher polymers with the catalyst with the lower acid content. Thus, the 20 percent catalyst yielded 42 percent by volume of $C_{12}$ plus including 12 percent $C_{15}$ while the 10 percent catalyst yielded 48 percent $C_{12}$ plus product including 15 percent $C_{15}$.

It was concluded from the above data that if silica gel or alumina are used as the support, the preferred heteropoly acid content is between about 15 and 25 weight percent, while if a silica containing support is used, such as

TABLE V.—EFFECT OF SILICOTUNGSTIC ACID CONCENTRATION ON THREE SUPPORTS

| Example No | XI | XII | XIII | XIV | XV | XVI | XVII |
|---|---|---|---|---|---|---|---|
| Catalyst Support | Silica Gel [1] | Silica Gel [1] | Silica Gel [1] | Silica-Alumina [3] | Silica-Alumina [3] | Alumina [4] | Alumina [4] |
| Heteropoly Acid | 20% Silicotungstic Acid | 10% Silicotungstic Acid | 5% Silicotungstic Acid | 20% Silicotungstic Acid | 10% Silicotungstic Acid | 20% Silicotungstic Acid | 10% Silicotungstic Acid |
| Reaction Temperature, °F | 253 | 256 | 253 | 251 | 250 | 252 | 252 |
| Pressure, p.s.i.g | 600 | 600 | 600 | 600 | 600 | 600 | 600 |
| LHSV (based on olefin only) | 1.04 | 0.99 | 0.96 | 0.99 | 0.99 | 1.03 | 0.99 |
| Propylene Conversion, mole percent | 99.7 | 91.9 | 33.2 | 95.2 | 94.3 | 96.8 | 63.1 |
| Polymer Recovery, percent by wt.[2] | 94.3 | 99.4 | 32.7 | 95.0 | 112.7 | 114.2 | 47.8 |
| Weight Balance, percent | 95.5 | 99.4 | 98.2 | 89.1 | 90.7 | 98.6 | 80.2 |
| Product Distribution, percent by vol.: | | | | | | | |
| Monoolefins: | | | | | | | |
| Dimer | 6 | 10 | 15 | 13 | 9 | 15 | 13 |
| Trimer | 28 | 43 | 53 | 39 | 38 | 36 | 49 |
| Tetramer | 26 | 29 | 25 | 27 | 32 | 31 | 27 |
| Pentamer | 22 | 14 | 6 | 13 | 16 | 18 | 11 |
| Heavier than Pentamer | 11 | 4 | 0 | 3 | 0 | 0 | 0 |
| Diolefins: | | | | | | | |
| Pentamer Range and Lighter | 5 | 0 | 1 | 5 | 5 | 0 | 0 |
| Heavier than Pentamer | 2 | 0 | 0 | 0 | 0 | 0 | 0 |
| Yield of Monoolefins having a maximum of 15 carbon atoms per molecule | 82 | 96 | 99 | 92 | 95 | 100 | 100 |
| Total Yield of diolefins, and monoolefins heavier than pentamer | 18 | 4 | 1 | 8 | 5 | 0 | 0 |

[1] Davison Grade 70.
[2] Weight of polymer recovered as percent of olefin fed.
[3] Harshaw S-46.
[4] Filtrol Grade 86.

Referring to the data in Table V, it can be seen that decreasing the silicotungstic acid content decreased conversion with all three supports. With silica gel, the reduction of the acid content from 20 to 10 percent lowered the conversion from 99.7 to 91.9 percent (compare Examples XI and XII). Further reduction of the acid content to 5 percent resulted in a very sharp decrease in conversion to 33.2 percent (Example XIII). There was also a shift in the molecular weight distribution to lower polya silica-aluminum support, the preferred heteropoly acid content is between about 8 and 15 weight percent.

As can be seen from the data above, high yields of monoolefins having a maximum of $C_{15}$ carbon atoms which are substantially diolefin free can be obtained by a proper combination of reaction temperature and the use of a catalyst comprising a tungsten containing heteropoly acid on a solid carrier. The process of this invention is advantageous in requiring the use of low reaction temperatures while at the same time maximizing the yield of desirable products, such as tetramer and pentamer. The use of other catalysts, such as phosphoric acid requires the use of much higher reaction temperatures on the order of 350° to 450° F. to achieve similar conversions while producing no predictable yield of pentamer. The use of Triple A silica-alumina alone as a propylene polymerization catalyst results in relatively unattractive conversions, i.e., conversions of about 83 percent were obtained at 400° F. and 600 p.s.i.g. using the silica-alumina catalyst. The use of 5 weight percent and 25 weight percent tungsten supported on the Triple A silica-alumina base showed no advantage over the base support for the production of polymer.

Resort may be had to such variations and modifications as fall within the spirit of the invention and the scope of the appended claims.

We claim:

1. A process for the polymerization of propylene wherein no aromatics are formed which comprises:
   contacting propylene at a temperature which is maintained between 100° F. and 300° F. with a catalyst comprising a tungsten containing heteropoly acid deposited on a support selected from the group consisting of the oxides of aluminum, silicon and magnesium and mixtures thereof for a time sufficient to produce substantially only polymers of propylene having a maximum of 15 carbon atoms per molecule.

2. A process according to claim 1 wherein the tungsten containing heteropoly acid is a phosphotungstic acid.

3. A process according to claim 1 wherein the tungsten containing heteropoly acid is silicotungstic acid.

4. A process according to claim 1 wherein the catalyst comprises between 5 and 20 weight percent of a tungsten containing heteropoly acid.

5. A process according to claim 1 wherein the space velocity of propylene is between 0.25 and 2.

6. A process for the polymerization of propylene wherein no aromatics and substantially no diolefins are produced which comprises:
   contacting propylene at a temperature which is maintained between 100° F. and 285° F. with a catalyst comprising a tungsten containing heteropoly acid deposited on a support selected from the group consisting of the oxides of aluminum, silcon and magnesum and mixtures thereof for a time sufficient to produce substantially only polymers of propylene having a maximum of 15 carbon atoms per molecule.

7. A process according to claim 6 wherein the reaction temperature is between 250° and 285° F.

8. A process for the polymerization of propylene wherein no aromatics are formed which comprises:
   contacting propylene at a temperature which is maintained between about 200° F. and 300° F. with a catalyst comprising silica gel having deposited thereon between 15 and 25 weight percent of said silica gel of a tungsten containing heteropoly acid.

9. A process in accordance with claim 8 above wherein the heteropoly acid is silicotungstic acid.

10. A process for the polymerization of propylene wherein no aromatics are formed which comprises:
    contacting propylene at a temperature which is maintained between about 200° F. and 300° F. with a catalyst comprising a silica alumina gel support having deposited thereon between 8 and 15 weight percent of said support of a tungsten containing heteropoly acid.

11. A process in accordance with claim 10 wherein the tungsten containing heteropoly acid is silicotungstic acid.

12. A process for the polymerization of propylene in a refinery propane-propylene stream wherein no aromatics are formed which comprises:
    contacting said refinery stream at a temperature which is maintained between 100° F. and 300° F. with a catalyst comprising a tungsten containing heteropoly acid deposited on a support selected from the group consisting of the oxides of aluminum, silicon and magnesium and mixtures thereof to produce substantially only polymers of propylene having a maximum of 15 carbon atoms per molecule.

13. A process according to claim 12 wherein the charge stock has 65 weight percent propylene and 35 weight percent propane.

14. A process according to claim 12 wherein the space velocity of propylene is between 0.25 and 2.

References Cited

UNITED STATES PATENTS

| | | | |
|---|---|---|---|
| 2,301,966 | 11/1942 | Michel et al. | 260—683.15 |
| 2,798,890 | 7/1957 | Waterman et al. | 260—683.15 X |
| 2,982,799 | 5/1961 | Klinkenberg et al. | 260—683.15 |

PAUL M. COUGHLAN, JR., *Primary Examiner.*